US012615082B2

(12) United States Patent
Sheth et al.

(10) Patent No.: US 12,615,082 B2
(45) Date of Patent: Apr. 28, 2026

(54) MACHINE LEARNING ENABLED SELF-DETECTION FOR TRUCK ROLLS ON END-USER SATELLITE TERMINALS

(71) Applicant: Hughes Network Systems, Germantown, MD (US)

(72) Inventors: Soham Sheth, Gaithersburg, MD (US); David Whitefield, Germantown, MD (US); Amit Arora, Clarksburg, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 598 days.

(21) Appl. No.: 17/932,138

(22) Filed: Sep. 14, 2022

(65) Prior Publication Data

US 2024/0088994 A1 Mar. 14, 2024

(51) Int. Cl.
*H04B 7/185* (2006.01)
*H04W 24/08* (2009.01)

(52) U.S. Cl.
CPC ..... *H04B 7/18519* (2013.01); *H04B 7/18517* (2013.01); *H04W 24/08* (2013.01)

(58) Field of Classification Search
CPC . H04W 36/0072; H04W 24/02; H04W 52/02; H04W 36/0064; H04W 36/0083; H04W 52/0203; H04W 24/08; G06N 3/0464; G06N 20/00; H04B 7/18519; H04B 7/18517
See application file for complete search history.

(56) References Cited

U.S. PATENT DOCUMENTS

| | | | | |
|---|---|---|---|---|
| 2019/0110211 A1* | 4/2019 | Jain | ........................ | H04W 24/02 |
| 2019/0141543 A1* | 5/2019 | Ganapathi | ............. | H04W 24/08 |
| 2020/0090009 A1* | 3/2020 | Arora | ...................... | G06F 18/23 |
| 2023/0024501 A1* | 1/2023 | Jana | ................... | H04B 17/3913 |
| 2024/0298225 A1* | 9/2024 | Hyde | ................ | H04W 36/0083 |

* cited by examiner

*Primary Examiner* — Dady Chery
(74) *Attorney, Agent, or Firm* — Capitol City TechLaw; Jasbir Singh

(57) ABSTRACT
A system and method for collecting, at a terminal, statistical data regarding performance of a transport between the terminal and a satellite; analyzing, at the terminal with an ML model, the statistical data to determine a failure state of the terminal and notifying a user of the failure state, wherein the ML model is trained on a training dataset collected from a terminal population, and the statistical data comprises a terminal state and transport metrics for the terminal.

18 Claims, 1 Drawing Sheet

100

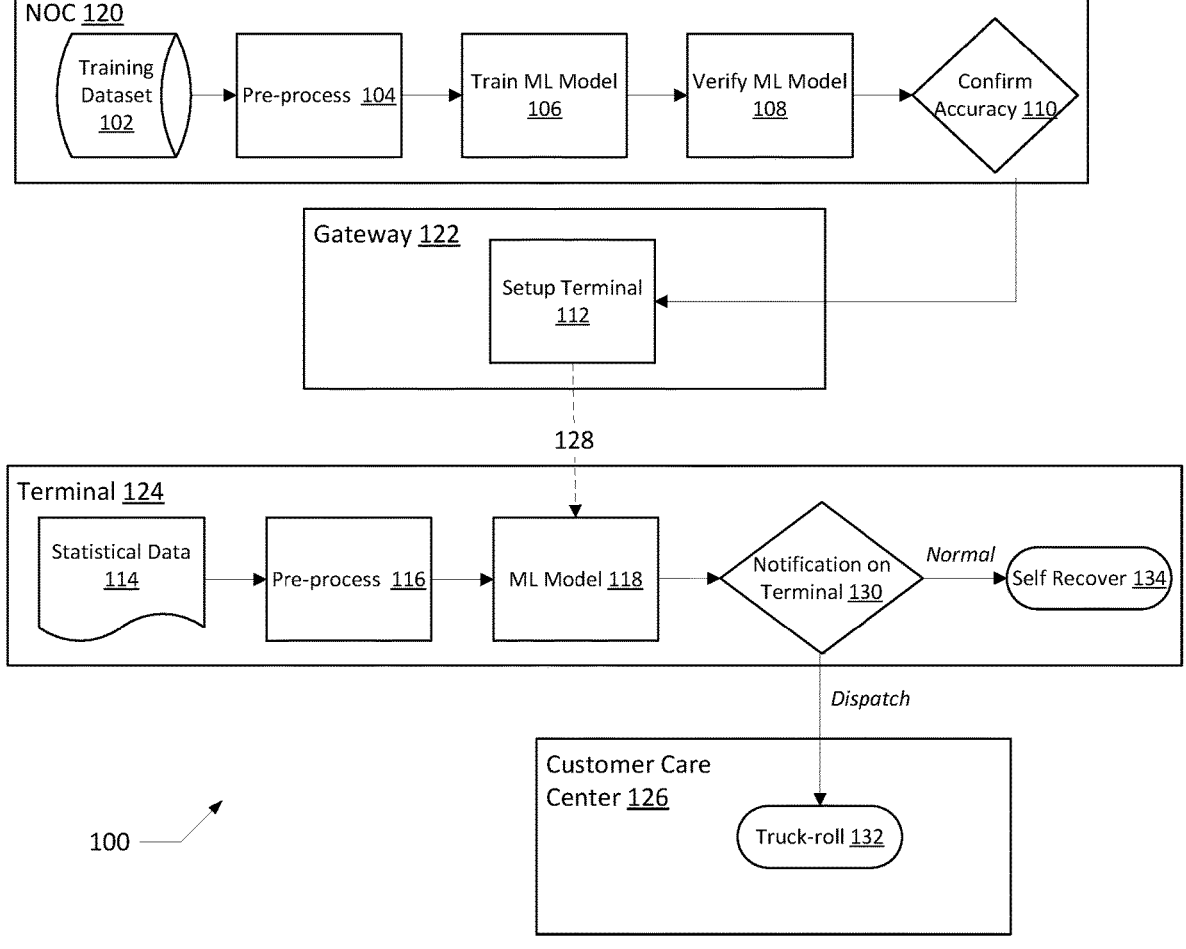

MACHINE LEARNING ENABLED SELF-DETECTION FOR TRUCK ROLLS ON END-USER SATELLITE TERMINALS

FIELD

Machine Learning techniques to enable a terminal to self-detect whether it is suffering a short-term transient issue that will likely resolve itself automatically or not. The Terminal may identify itself as either a 'Dispatch' terminal requesting a technician be dispatched to the site or a 'Normal' terminal when issues are expected to be resolved and a normal state will be attained automatically after some time.

BACKGROUND

End-user satellite terminals, part of a larger satellite ground system, reside at the customer site. When the network provider's customer care gets called for support, there is often no practical way for customer care to reach the remote Terminal such as due to its current issue to determine whether there is a need for a service technician to travel to the customer site to diagnose the issue with the terminal (referred to as a "truck roll"). This results in costly unnecessary/incorrect truck rolls. Moreover, the response can be delayed based on the availability of technicians to visit the site.

There are some manual methods devised to filter or categorize if terminals need a truck roll, but a manual approach is not scalable. Often the issue is a short-term transient issue that resolves itself automatically before the service technician arrives to resolve the issue when the visit is not cancelled in time.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

The present teachings automatically identify terminals that need truck roll in order to improve response time. This enables operators to avoid unnecessary truck rolls and reduce expenses. Additionally, the Terminals may deploy self-healing based on an output of the Machine Learning model and help reduce the volume of calls customer care gets. As such, the present teachings save money spent of truck rolls by limiting them to the ones that are necessary, improve response time for the Terminals that need a truck roll, and reduce a volume of customer support calls.

In some aspects, the techniques described herein relate to a method for determining a failure state of a satellite terminal using a Machine Learning (ML) system including a computer processor, the method including: collecting, at a terminal, statistical data regarding performance of a transport between the terminal and a satellite; analyzing, at the terminal with an ML model, the statistical data to determine a failure state of the terminal; and notifying a user of the failure state, wherein the ML model is trained on a training dataset collected from a terminal population, and the statistical data includes a terminal state and transport metrics for the terminal.

In some aspects, the techniques described herein relate to a method, further including pre-processing the statistical data to homogenize and to normalize the statistical data prior to the analyzing.

In some aspects, the techniques described herein relate to a method, wherein the failure state includes one or more of a normal state, a dispatch state, or a failure prediction.

In some aspects, the techniques described herein relate to a method, wherein the failure state includes a likely cause of an operational failure.

In some aspects, the techniques described herein relate to a method, wherein the failure state includes a predicted failure duration.

In some aspects, the techniques described herein relate to a method, wherein the terminal performs a self-healing based on the failure state.

In some aspects, the techniques described herein relate to a method, wherein the notifying includes displaying the failure state.

In some aspects, the techniques described herein relate to a method, wherein the notifying includes sending a message to a customer care center prior to the failure state necessitating a truck roll.

In some aspects, the techniques described herein relate to a method, further including setting up the ML model in the terminal over the transport for execution at the terminal.

In some aspects, the techniques described herein relate to a method, wherein the transport metrics include one or more of a frequency band, a satellite constellation, an antenna, a carrier frequency, a gateway identification, an outdoor unit, a Packet Loss Rate (PLR), a Modulation and Coding (MOD-COD) symbol rate, a MODCOD modulation, a transport layer queue depth, a transport layer queue latency, a link type, a congestion level, an interface cost, a latency, a jitter, bytes sent and received, a terminal restart count or a combination thereof.

In some aspects, the techniques described herein relate to a satellite communication system to determine a failure state of a satellite terminal using a Machine Learning (ML) system including a computer processor, the satellite communication system including: a terminal to collect statistical data regarding performance of a transport between the terminal and a satellite, and to notify a user of a failure state; and an ML model, at the terminal, to analyze the statistical data to determine the failure state of the terminal, wherein the ML model is trained on a training dataset collected from a terminal population, and the statistical data includes a terminal state and transport metrics for the terminal.

In some aspects, the techniques described herein relate to a satellite communication system, wherein the ML model pre-processes the statistical data to homogenize and to normalize the statistical data prior to the analyzing.

In some aspects, the techniques described herein relate to a satellite communication system, wherein the failure state includes one or more of a normal state, a dispatch state, or a failure prediction.

In some aspects, the techniques described herein relate to a satellite communication system, wherein the failure state includes a likely cause of an operational failure.

In some aspects, the techniques described herein relate to a satellite communication system, wherein the failure state includes a predicted failure duration.

In some aspects, the techniques described herein relate to a satellite communication system, wherein the terminal performs a self-healing based on the failure state.

In some aspects, the techniques described herein relate to a satellite communication system, wherein the terminal displays the failure state.

In some aspects, the techniques described herein relate to a satellite communication system, wherein the terminal sends a message to a customer care center prior to the failure state necessitating a truck roll.

In some aspects, the techniques described herein relate to a satellite communication system, wherein the terminal receives the ML model over the transport to execute at the terminal.

In some aspects, the techniques described herein relate to a satellite communication system, wherein the transport metrics include one or more of a frequency band, a satellite constellation, an antenna, a carrier frequency, a gateway identification, an outdoor unit, a Packet Loss Rate (PLR), a Modulation and Coding (MODCOD) symbol rate, a MOD-COD modulation, a transport layer queue depth, a transport layer queue latency, a link type, a congestion level, an interface cost, a latency, a jitter, bytes sent and received, a terminal restart count or a combination thereof.

Additional features will be set forth in the description that follows, and in part will be apparent from the description, or may be learned by practice of what is described.

DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail with the accompanying drawings.

FIG. 1 illustrates a process to determine a failure state of a terminal using a Machine Learning (ML) system according to various embodiments.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The present teachings may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGURES illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

The present teachings relate to Machine Learning techniques that enable a terminal to self-detect whether it is suffering a short-term transient issue that will likely resolve itself automatically or not. The Terminal may identify itself as either a 'Dispatch' terminal requesting a technician be dispatched to the site or a 'Normal' terminal when issues are expected to be resolved and a normal state will be attained automatically after some time.

At a high level as part of the machine learning and training, a training dataset including limited statistics data may be collected from a terminal population, for example, by a Network Management System at a Network Operations Center (NOC). The training dataset may be used to build, train, and optimize a Neural Network classifier model to determine a necessity of a truck roll. The trained model may be optimized and converted to a lightweight, portable and compressed format, for example, by using the Tensorflow Machine Learning framework's utilities. This model file may be pushed as a download file to Terminals, where the model gets loaded and classifies itself periodically as either a 'Normal' or 'Dispatch' site based on statistics data it collected about itself for a duration, for example, the past 24-hours, hourly or the like.

In some embodiments, an edge or embedded device, for example, a satellite terminal, is used to load and run the trained Neural Network model to draw inferences regarding itself. As such, an edge device is capable of self-diagnosing issues using Machine Learning techniques when isolated from the network. In some embodiments, the model may initiate self-healing, for example, via a simple automatic reboot, a forced re-range. The self-healing may be based on the output of the ML classification model to try and recover a Terminal that is not tagged as 'Dispatch' but still has some issues. This can help reduce the volume of calls customer care gets as well. In some embodiments, the customer care center may be able initiate self-healing based on the output.

Generally, most ML computations and programs are run on a central NOC side —. However, the arrival of a new generation of more powerful Terminal opens the possibility of performing ML computations on the Terminal itself at the boundary edge of the network.

Machine learning frameworks, for example, Tensorflow Lite, enable on-device machine learning. A pre-trained model in the ML framework may be optimized for speed or storage. Limited statistics data may be collected and consolidated from a large number of terminals, for example, a thousand terminals, at a NOC. A model may be built and using this data. The trained model may be converted into a compressed format, for example, a Tensorflow Lite format. The model may be loaded on the Terminal to consume recent data for a desired duration, for example, 24-hour, 1 hour or the like. The loaded model may evaluate the recent data to identify the terminal as either a normal or a dispatch site. The steps may include loading the model into memory and then building an interpreter based on the loaded model. The steps may include setting up input data and an invoking inference using the ML model. The steps may include reading an output that includes a prediction of the Terminal state. The Terminal may display this prediction on its local web user interface as a warning or state code for the customer to report to customer care when requested via the phone. This can occur even when the customer care operator is not able to reach the Terminal for this information in-band over the network to remotely diagnose the issue.

FIG. 1 illustrates a process to determine a failure state of a terminal using a Machine Learning (ML) system according to various embodiments.

A satellite communication system 100 may include a Network Operations Center (NOC) 120, a gateway 122, a satellite (not shown), a terminal 124, a customer care center 126 and a satellite transport 128. The gateway 122 may provide internet connectivity and the like to the terminal 124 over the satellite transport 128. The satellite transport 128 may be relayed between the gateway 122 and the terminal 124 via the satellite.

The NOC 120 may include a training dataset 102 collected from a terminal population of the satellite communication system 100. The NOC 120 may include a preprocess block 104 to obtain balanced training data. The preprocess block 104 may normalize and harmonize the training dataset 102, for example, for power levels, satellite being used, a carrier and the like. The NOC 120 may include a train ML model block 106 to train a ML model on the training dataset 102. The trained ML model from the train ML model block 106 may be verified for accuracy at block 108. The verification may compare recommendations of a seasoned customer service technician with the failure states generated by the trained ML model at block 110. When sufficiently accurate results are produced by block 110, the trained ML model may be deemed ready for deployment.

The gateway 122 servicing the terminal 124 may be used to setup the terminal 124 with the trained ML model at setup block 112. The setup block 112 may download or push the trained ML model, for example, in a compressed format using a satellite link, to the terminal 124 for installation as ML Model 118 via the satellite transport 128.

The terminal 124 may install and then execute the trained ML model received from the setup block 112 to perform self-checks. Statistical data 114 of the terminal 124 may be provided to a pre-process block 116 at the terminal for input into the ML model 118 for analysis. Results of the analysis by the ML model 118 may be sent out as notifications at a notification on terminal block 130. The notifications may be messages on a display, indicator lights, status messages transmitted to a customer care center 126 or the like. In some embodiments, the notification on terminal block 130 may initiate a self-healing when a normal failure state is observed. The self-recover 134 block may perform the self-healing.

In some embodiments, the satellite transport 128 may be used to send the notification including a dispatch request to the customer care center 126. When the satellite transport 128 between the terminal 124 and the gateway 122 is unavailable, an out-of-band communication, for example, a phone call, may be used to request a truck roll from the customer care center 126. Upon receiving a dispatch notification from the notification on terminal block 130, the customer care center 126 may queue a truck roll request 132 based on the communication received via the satellite transport 128 or from a out-of-band notification.

Classification Criteria

Based on the field data collected for Terminals, a terminal needs truck-roll if it transitions through specific states or sticks to a particular state for a long duration. Additionally, data related to usage patterns—the number of bytes sent and received—help identify active vs. inactive terminals. Terminal restart data may indicate some underlying persistent issues or problems that require a service technician to resolve. The machine learning model uses all this field data to learn and classify a Terminal as either 'Normal' (which doesn't need an immediate truck-roll) or 'Dispatch' (which needs truck-roll).

In other scenarios, an 'active' terminal transitioning through some specific states could point at an underlying problem requiring a truck roll. This could potentially be scheduled proactively to avoid last-minute haste or delayed response time if the Terminal can identify itself at 'Dispatch.' At the same time, this can avoid an unnecessary truck roll for an 'inactive' site since the inactive terminal will not classify itself as 'Dispatch' site.

For example, two Terminals with downlink problems having no communication capability may be treated differently. While Terminals A and B lost lock on outroute, terminal A lost the outroute after transitioning multiple times through a state indicating satellite cable quality problems or broken satellite cable. In contrast, terminal B lost outroute connectivity without transitioning through any other states. Without communications to the terminals, the network provider cannot remotely reach the Terminal via its satellite network. In this scenario, the ML model may determine that Terminal B is likely recover on its own, while Terminal A needs an actual truck-roll to fix the underlying problem. The determination (truck roll needed or temporary interruption) may be provided to a terminal user on a display, via a notification, an indicator light or the like. The user may use an out-of-band communication (for example, telephone call) to reach a customer care center for a truck roll. Without the determination by the ML model, Customer care would potentially schedule a truck roll for both sites A and B where it could have avoided it for site B and saved money.

The proposed solution identifies Terminal A as a 'Dispatch' site and Terminal B as a 'Normal' site with over a high degree of confidence. Furthermore, additional self-healing mechanisms like a simple automatic reboot or force re-range can be implemented based on the output of the ML classification model to try and recover a Terminal that is not tagged as 'Dispatch' but still has some issues. This can help reduce the volume of calls customer care gets as well and increase customer satisfaction.

Transport Metrics

A terminal and/or transport condition may be reflected in transport metrics of an inroute link, an outroute link, or both links. Some metrics listed below may not be usable together at the same time. Some of the metrics may be used as a group by the ML model. Different metrics may be given different weights when analyzing an operational state or failure severity of the terminal. Transport metrics may be periodically propagated from the terminal/modem to the ML model. Exemplary transport metrics may include:

inroute stream error rates on both inroute paths or through the IDUs inroute Transport Layer Queue depths and priority inroute Transport Layer Queue latency latency and jitter of inroute traffic on the paths congestion level in the inroute direction on the paths inroute Stream bandwidth assignment history on the paths the current inroute symbol rate, modulation and coding rates on the paths outroute SQF or signal strength on the paths outroute Transport Layer Queue depths and priorities outroute Transport Layer Queue latency outroute Packet Loss rates on the paths outroute congestion level on the paths the current outroute MODCODs (modulation and coding) on the paths the operational state code of the modem.

gateway identification outdoor unit

Packet Loss Rate (PLR)

Modulation and Coding (MODCOD) symbol rate

MODCOD modulation transport layer queue depth transport layer queue latency congestion level bytes sent and received terminal restart count.

Having described preferred embodiments of a system and method (which are intended to be illustrative and not limiting), it is noted that modifications and variations can be made by persons skilled in the art considering the above teachings. It is therefore to be understood that changes may be made in the embodiments disclosed which are within the scope of the invention as outlined by the appended claims. Having thus described aspects of the invention, with the details and particularity required by the patent laws, what is claimed and desired protected by Letters Patent is set forth in the appended claims.

We claim:

1. A method for determining a failure state of a satellite terminal using a Machine Learning (ML) system comprising a computer processor, the method comprising:

collecting, at a terminal, statistical data regarding performance of a transport between the terminal and a satellite;

analyzing, at the terminal with an ML model, the statistical data to determine a failure state of the terminal;

notifying a user of the failure state; and pre-processing the statistical data to homogenize and to normalize the statistical data prior to the analyzing, wherein the ML model is trained on a training dataset collected from a terminal population, and the statistical data comprises a terminal state and transport metrics for the terminal.

2. The method of claim 1, wherein the failure state comprises one or more of a normal state, a dispatch state, or a failure prediction.

3. The method of claim 1, wherein the failure state comprises a likely cause of an operational failure.

4. The method of claim 1, wherein the failure state comprises a predicted failure duration.

5. The method of claim 1, wherein the terminal performs a self-healing based on the failure state.

6. The method of claim 1, wherein the notifying comprises displaying the failure state.

7. The method of claim 1, wherein the notifying comprises sending a message to a customer care center prior to the failure state necessitating a truck roll.

8. The method of claim 1, further comprising setting up the ML model in the terminal over the transport for execution at the terminal.

9. The method of claim 1, wherein the transport metrics comprise one or more of a frequency band, a satellite constellation, an antenna, a carrier frequency, a gateway identification, an outdoor unit, a Packet Loss Rate (PLR), a Modulation and Coding (MODCOD) symbol rate, a MODCOD modulation, a transport layer queue depth, a transport layer queue latency, a link type, a congestion level, an interface cost, a latency, a jitter, bytes sent and received, a terminal restart count or a combination thereof.

10. A satellite communication system to determine a failure state of a satellite terminal using a Machine Learning (ML) system comprising a computer processor, the satellite communication system comprising:

a terminal to collect statistical data regarding performance of a transport between the terminal and a satellite, and to notify a user of a failure state; and an ML model, at the terminal, to analyze the statistical data to determine the failure state of the terminal, wherein the ML model is trained on a training dataset collected from a terminal population, and the statistical data comprises a terminal state and transport metrics for the terminal, and wherein the ML model pre-processes the statistical data to homogenize and to normalize the statistical data prior to the analyzing.

11. The satellite communication system of claim 10, wherein the failure state comprises one or more of a normal state, a dispatch state, or a failure prediction.

12. The satellite communication system of claim 10, wherein the failure state comprises a likely cause of an operational failure.

13. The satellite communication system of claim 10, wherein the failure state comprises a predicted failure duration.

14. The satellite communication system of claim 10, wherein the terminal performs a self-healing based on the failure state.

15. The satellite communication system of claim 10, wherein the terminal displays the failure state.

16. The satellite communication system of claim 10, wherein the terminal sends a message to a customer care center prior to the failure state necessitating a truck roll.

17. The satellite communication system of claim 10, wherein the terminal receives the ML model over the transport to execute at the terminal.

18. The satellite communication system of claim 10, wherein the transport metrics comprise one or more of a frequency band, a satellite constellation, an antenna, a carrier frequency, a gateway identification, an outdoor unit, a Packet Loss Rate (PLR), a Modulation and Coding (MODCOD) symbol rate, a MODCOD modulation, a transport layer queue depth, a transport layer queue latency, a link type, a congestion level, an interface cost, a latency, a jitter, bytes sent and received, a terminal restart count or a combination thereof.

* * * * *